Nov. 15, 1966  G. C. SANCHEZ  3,286,255
PILOT OR TELLTALE LIGHT ASSEMBLY
Filed April 11, 1963
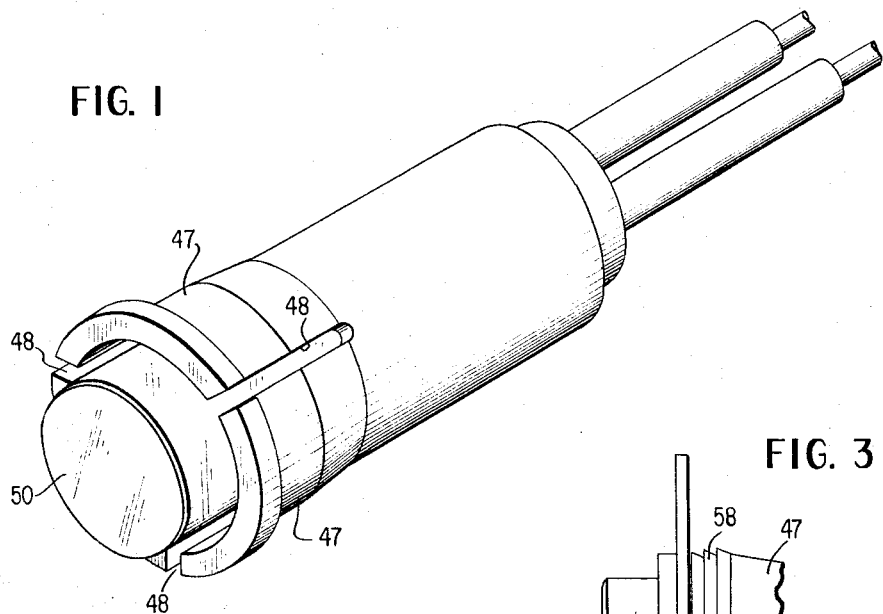
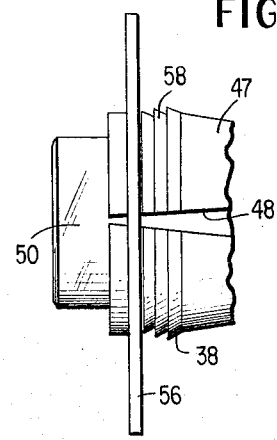
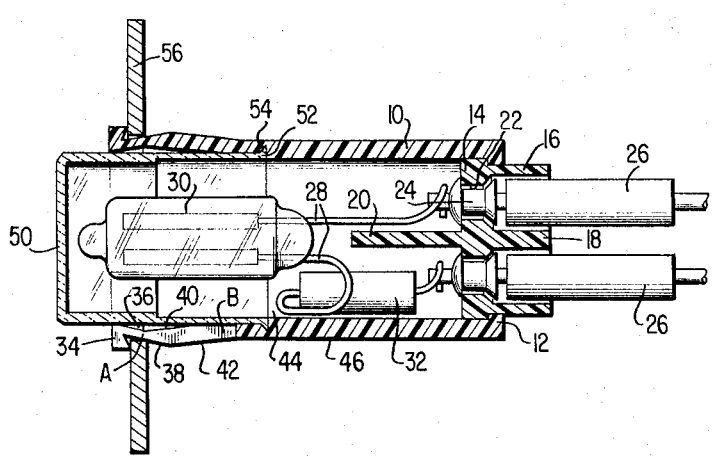
INVENTOR.
GIL C. SANCHEZ
BY
ATTORNEYS.

United States Patent Office 3,286,255
Patented Nov. 15, 1966

3,286,255
PILOT OR TELLTALE LIGHT ASSEMBLY
Gil C. Sanchez, Bronx, N.Y., assignor to Leecraft Manufacturing Co., Inc., Long Island City, N.Y., a corporation of New York
Filed Apr. 11, 1963, Ser. No. 272,442
1 Claim. (Cl. 340—381)

The present invention relates generally to electric indicating or signalling devices and more particularly to a telltale or pilot light assembly and its mounting or positioning within a suitable holder or support.

The use of pilot or telltale lights in connection with certain types and kinds of instruments and appliances has not been very extensive, yet said use from the safety standpoint or factor is highly desirable. It has been ascertained that said non-usage has been due, in many instances, either to the cost involved or to the time and effort consumed in assembling such a pilot or telltale light in an instrument or appliance. In many instances, the size of the pilot or telltale light assembly was such as to preclude its being mounted in an instrument or in an appliance and when there was space provided for such a device, the manner in which it was positioned in the instrument or appliance was such as to require numerous washers, locknuts and the like to insure its proper retention within said instrument or appliance. Such conditions were more than enough to preclude the usage of a pilot or telltale light assembly in many instruments and appliances even though such usage would be highly advantageous and desirable particularly from the safety standpoint.

Another point of objection to the use of a pilot or a telltale light in conjunction with an instrument or appliance has been the lack of brilliance of the indicating lamp or bulb. In order to provide a sufficiently brilliant pilot or telltale light assembly, it has been found from usage or prior art devices that it was necessary to employ a rather large and cumbersome unit in order to insure a sufficient amount of light being emitted from the assembly. Thus, the size of the pilot or telltale light that had to be used, in order to be sufficiently brilliant to assure that the operator's attention would be attracted, was so great, in the majority of instances, as to make the instrument or appliance a manufacturing liability from the standpoint of cost alone.

One of the objects of the present invention is to provide a relatively simple and rugged pilot light assembly that is so designed to produce a brilliant light through the use of a neon glow pilot light.

Another object is to provide a pilot light assembly having a unique lens design for producing a brilliant indicating light.

Another object is to provide a pilot light having a housing of a design and configuration for telescopically receiving an elongated lens for capturing and directing towards the front of the housing the light emitted from a lamp mounted within said housing.

A further object is to provide a pilot or telltale light assembly having a housing with a base member positioned in one end thereof for supporting and carrying all of the electrical connections and components of said light.

Still another object is to provide a pilot light assembly including a housing with a lamp therein and an elongated lens substantially encompassed by the housing wherein the housing is mounted within a panel or supporting member for insuring retention of the lens within said housing.

A further object is to provide a pilot light assembly having a housing for receiving a lens and a lamp and wherein the housing is formed with an annular flange for engaging a panel to position the housing within said panel.

A still further object is to provide a pilot light assembly that is composed of a plurality of parts that are assembled as a unit which is then inserted with a snap action into an aperture provided in a panel or supporting member.

Other objects of the present invention are to provide a pilot light assembly which is formed from insulating material so as to be electrically safe, which is easily mounted within a panel or supporting member and which is economical of manufacture and operation.

Other objects and advantages, more or less ancillary to the foregoing in the manner in which all of the various objects are realized, will appear in the following description, which, when considered in conjunction with the accompanying drawing, sets forth the preferred embodiment of the invention.

Referring to the drawing wherein the preferred embodiment of the invention is illustrated:

FIGURE 1 is a perspective view of the pilot light assembly embodying the present invention;

FIGURE 2 is a longitudinal sectional view of the pilot light assembly of the present invention shown mounted in an opening of a panel or supporting member; and FIGURE 3 is a side elevational view of a fragmentary portion of a modified pilot light assembly mounted in a panel or supporting member.

Referring to FIGURE 2 of the drawing, there is shown a tubular housing 10 of elongated configuration which has formed integrally with one end thereof an inwardly projecting annular flange 12. The housing 10 has positioned therein an annular base or supporting member 14 which has formed integrally therewith a reduced end portion 16. The external diameter of the base member 14 is substantially the same as the internal diameter of the housing 10 while the external diameter of the end portion 16 is comparable to the diameter of the opening defined by the annular flange 12. Thus, the base member 14 and reduced portion 16 have a relatively tight sliding fit within the rear or innermost end portion of the housing 10 and the opening as defined by the annular flange 12 respectively.

The base member 14 and reduced end portion 16 have a median partition member 18 formed integrally therewith which terminates in a segmental portion 20 that projects upwardly from the top of the base member 14 into the central portion of the housing 10 so as to act as a divider for a portion of the housing. The base member 14 has formed therein a pair of apertures or sockets 22 which are adapted to receive suitable eyelets 24, with the partition member 18 being interposed therebetween. Each of the eyelets 24 has a lead wire or a terminal lug 26 connected thereto by any suitable means, such as soldering. The end portion 16 and the partition member 18 define sockets or guides for the lead wires that are carried by the eyelets 24 within the base member 14. The eyelets 24, which have the lead wires or terminal lugs 26 fastened thereto, also have secured thereto by any suitable means, such as soldering, the leads 28 of a conventional neon glow lamp 30. One of the leads 28 has interposed therein a resistor 32, of any conventional type, so that through a proper combination of resistor and neon glow light a very high working voltage may be employed in connection with the present pilot light assembly.

The other or front end of the housing 10 has formed integrally therewith an outwardly extending annular bead or lip 34 with the portion A of the housing 10 contiguous the bead 34 being materially reduced in wall thickness.

The inner and outer wall surfaces 36 and 38 respectively, of the reduced portion A of the housing 10 are inclined outwardly and away from the bead 34 in parallel planes with the inner wall surface 36 extending a shorter distance in said plane than does the outer wall surface 38. The inner and outer wall surfaces 36 and 38 of the reduced portion A of the housing 10 terminate in inwardly inclined parallel wall surfaces 40 and 42, respectively, which merge with the inner and outer wall surfaces 44 and 46, respectively, of the housing 10 within the general area designated B. The length of the inner wall surface 40 is less than that of the outer wall surface 42 so that said inner wall surface 40 merges or joins the inner surface 44 of the housing 10 within the area B but offset from where the outer wall surface 42 of the reduced portion A joins the outer wall surface 46 of the housing 10. Thus, in the reduced wall thickness portion A of the housing 10 the outer wall surfaces 38 and 42 are of a greater length than are the inner wall surfaces 36 and 40 so that the point of intersection of the inner wall surfaces is offset from that of the outer wall surfaces.

The annular bead or lip 34 and forward portion of the housing 10 are provided with a plurality of inherently resilient equal segments 47. The segments 47 are defined by spaced parallel slots 48 which extend through the bead 34 and forward portion of the housing 10, terminating in the area or region B. The difference in inclination of the wall surfaces 36–40 and 38–42 and the reduced wall thickness of the housing 10 in the area A imparts to the segments 47 a certain degree of resiliency so that said segments can be radially contracted or compressed upon the housing 10 being mounted in a suitable panel or supporting member. An elogated tubular lens 50 is positioned within the slotted or front end portion of the housing 10 so as to substantially encompass or enclose the light or lamp 30. The inner or lower end of the lens 50 is formed with an outwardly flared lip 52 that is positioned or mounted within an annular groove or recess 54 formed in the inner wall surface 44 of the housing 10 for retaining the lens within the front end of the housing 10.

The housing 10 is preferably made from a tough and resilient material, such as nylon, yet, due to the configuration of the front portion of the housing when taken in conjunction with the slots 48, the segmental portions of said housing will have sufficient resiliency to permit the housing to be secured within a suitable supporting member or panel structure. The mounting of the pilot light assembly in a supporting member or panel is accomplished by providing an aperture in said member or panel of a diameter slightly greater than that of the housing 10 but less than the diameter of the housing taken through the segments 47 in the regions A and B. Thus, the segments 47 provide a snap action as they are first compressed and then partially expanded as the housing is moved through the aperture until the bead 34 abuts the panel or supporting member. The inherent resiliency of the housing 10 not only permits the mounting of the housing within a supporting member or panel without the use of mounting clips or screws, but eliminates any source of noise that might be due to vibration of the supporting member or panel structure. The base member 14, as well as the reduced end portion 16 and median partition 18, are also formed from the same type of material from which the housing 10 is formed, and thus the base member 14 constitutes in conjunction with the housing 10 an effective insulating member to insure the elimination of any and all short circuits being transmitted to the supporting member or panel structure.

In the assembling and mounting of the pilot light unit in supporting structure or panel member, the base member 14 carrying the eyelets 24 with the lead wires 26, leads 28, resistor 32 and glow lamp 30 all as an assembled unit, are inserted into the front end of the housing 10. The base member 14 and assembled elements are then moved towards the opposite end of the housing 10 until the base member 14 abuts the inwardly extending annular flange 12 of the housing 10 and the reduced end portion 16 of said base member projects through the opening defined by said annular flange. The lens 50 is then inserted into the slotted end portion of the housing 10 until the outwardly flared lip 52 snaps into the annular recess 54 in the wall surface 44. The housing 10 with the assembled base member 14 therein is then inserted through a suitable aperture in a panel 56 and moved through said aperture so that the portions of the panel which define the opening therein engage and move over the wall surfaces 42. Such movement radially compresses or contracts the segments 47 and forces a portion of the inner surfaces 40 as well as the portion of the inner surface 36 in the plane of the bead 34 against the sides of the lens 50 for securely locking said lens within said housing 10 while at the same time securing the housing and the assembled elements within a panel member 56. After mounting the housing 10 within the panel member 56, the wire leads 26 may be connected in a conventional manner to a suitable source of power.

The lens 50 may be formed from a transparent or a translucent plastic material, and said lens may be of any shape or configuration commensurate with that of the housing in which it is mounted. The lens may also be of such a size as to protrude from the front of the housing 10 in the manner as shown in FIG. 2. or if so desired, a smaller lamp 30 may be mounted within the housing 10 and a smaller lens may also be used so that said lens will be completely disposed within the housing in its final assembly. The use of an elongated lens 50 in the manner as shown in FIG. 2 permits said lens to capture any and all of the light that is emitted from the side of the lamp 30 as well as the light that is projected from said lamp 30 towards the front face of the lens 50. Such an arrangement results in the greater portion of the light that is emitted from the lamp 30 being directed towards the front face of the lens so as to provide a brilliant light that is emitted from the front face of the lens of the pilot light assembly.

In the modified pilot light assembly shown in FIG. 3, the parts thereof are identical in all respects with those shown in FIG. 2 with the exception that the outer wall surface 38 is provided with a saw tooth design with the edge of the teeth 58 being inclined towards the annular bead 34. Such an arrangement as this virtually insures the retention of the housing 10 of the pilot light assembly within a supporting member or panel 56.

Although the foregoing description is necessarily of a detailed character, in order that the invention may be completely set forth, it is to be understood that the specific terminology is not intended to be restrictive or confining, and that various rearrangements of the parts and modification of detail may be resorted to without departing from the scope or spirit of the invention as herein claimed.

I claim:

A pilot light assembly for detachably mounting in an apertured supporting member, a tubular elongated housing formed of inherently resilient material, one portion of said housing having spaced slots provided therein and defining a plurality of segments, an annular bead formed on each of said segments at the end of said housing, each of said segments being formed with a plurality of external grooves adjpacent said annular bead, a neon glow lamp disposed within said housing and positioned within the segmented portion of the housing, and an elongated tubular lens positioned within the segmented portion of said housing and encompassing said lamp, said lens being provided with an outwardly flared lip, said housing being provided with an annular recess formed in the inner surface thereof adjacent the inner end of said slots for receiving said outwardly flared lip of said lens, said housing with said neon glow lamp and lens positioned therein extending through said aperture with said bead abutting said supporting member, said supporting member engaging one of said external annular grooves and compressing said segments against said lens for retaining said lens in the housing.

References Cited by the Examiner

UNITED STATES PATENTS

| | | | |
|---|---|---|---|
| 2,424,757 | 7/1947 | Klumpp | 174—153 |
| 2,647,222 | 7/1953 | Nieset | 339—126 |
| 2,740,111 | 3/1956 | Bogue et al. | 340—381 |
| 2,742,636 | 4/1956 | Alden | 340—381 |
| 2,809,283 | 10/1957 | Spencer. | |

FOREIGN PATENTS 827,795  2/1960  Great Britain.

OTHER REFERENCES

IBM Technical Disclosure Bulletin; "Quick Mounting Light Receptacle" by Larrabee; vol. 1, No. 5, Feb. 1959.

NEIL C. READ, *Primary Examiner.*

D. K. MYER, *Assistant Examiner.*